United States Patent [19]

Ackerman et al.

[11] Patent Number: 4,880,506

[45] Date of Patent: Nov. 14, 1989

[54] ELECTROREFINING PROCESS AND APPARATUS FOR RECOVERY OF URANIUM AND A MIXTURE OF URANIUM AND PLUTONIUM FROM SPENT FUELS

[75] Inventors: John P. Ackerman, Downers Grove; William E. Miller, Naperville, both of Ill.

[73] Assignee: The United States of America as represented by the Department of Energy, Washington, D.C.

[21] Appl. No.: 117,880

[22] Filed: Nov. 5, 1987

[51] Int. Cl.$^4$ .............................................. C25C 3/34
[52] U.S. Cl. .................................. 204/1.5; 204/64 R; 204/225; 204/245; 204/250
[58] Field of Search ................ 204/1.5, 39, 64 R, 225, 204/243 R, 245, 250, 259, 59 R; 376/311, 359, 360; 423/3

[56] References Cited

U.S. PATENT DOCUMENTS 2,951,793  9/1960  Hansen .............................. 204/64 R
4,596,647  6/1986  Miller et al. .

OTHER PUBLICATIONS

Burris et al., "The Application of Electrorefining for Recovery and Purification of Fuel Discharged from the Integral Fast Reactor", Nov. 1986, AICHE Symposium Series: No. 254, v83.
Martin et al., "The Cadmium-Uranium Phase Diagram", Transactions of the Metallurgical Society of AIME, vol. 22, pp. 789-791, Aug. 1961.
Johnson et al., "Thermodynamics of the Uranium-Cadmium System", Transactions of the Metallurgical Society AIME, vol. 224, pp. 468-473, Jun. 1962.
Johnson et al., "Pu-Cd System: Thermodynamics and Partial Phase Diagram", Transactions of the Metallurgical Society of AIME, vol. 233, pp. 1408-1414, Jul. 1965.
Steunenberg et al., "Preliminary Flowsheet for the Pyroprocessing of Recycled IFR Core Fuel Blanket Material and Wastes", IFR Technical Memorandum, No. 46, Jul. 1986.

Primary Examiner—John F. Niebling
Assistant Examiner—Kathryn Gorgos
Attorney, Agent, or Firm—James W. Weinberger; Thomas G. Anderson; Judson R. Hightower

[57] ABSTRACT

An electrorefining process and apparatus for the recovery of uranium and a mixture of uranium and plutonium from spent fuel using an electrolytic cell having a lower molten cadmium pool containing spent nuclear fuel, an intermediate electrolyte pool, an anode basket containing spent fuel, and two cathodes, the first cathode composed of either a solid alloy or molten cadmium and the second cathode composed of molten cadmium. Using this cell, additional amounts of uranium and plutonium from the anode basket are dissolved in the lower molten cadmium pool, and then substantially pure uranium is electrolytically transported and deposited on the first alloy or molten cadmium cathode. Subsequently, a mixture of uranium and plutonium is electrotransported and deposited on the second molten cadmium cathode.

18 Claims, 3 Drawing Sheets

ELECTROREFINING PROCESS AND APPARATUS FOR RECOVERY OF URANIUM AND A MIXTURE OF URANIUM AND PLUTONIUM FROM SPENT FUELS

CONTRACTUAL ORIGIN OF THE INVENTION

The United States Government has rights in this invention pursuant to Contract No. W-31-109-38 between the United States Department of Energy and Argonne National Laboratory.

BACKGROUND OF THE INVENTION

This invention relates to a process and apparatus for electrolytically refining spent fuel from a nuclear reactor and recovering purified uranium and a mixture of uranium and plutonium for use as fresh blanket and core fuels in a nuclear reactor. More particularly, this invention relates to a process and apparatus for refining spent blanket and core fuel in a single electrorefining cell by dissolving uranium and plutonium from the spent fuel in a molten cadmium pool, electrolytically depositing purified uranium on one cathode and subsequently electrolytically depositing a mixture of uranium and plutonium on a second cathode.

Electrorefining processes have been generally used to recover high purity metal or metals from impure feed materials and more particularly, to recover metals, such as uranium and plutonium, from spent nuclear fuel. Electrorefining of spent nuclear fuel is carried out in an electrolysis cell of the kind disclosed in U.S. Pat. Nos. 2,951,793 and 4,596,647. In such cells, the spent nuclear fuel forms the anode, or is dissolved in a anode pool. An electrolyte of fused salts is used, and the purified metal is transferred electrolytically and collected on the cathode. In other designs, the anode pool is located at the bottom of the cell, and the cathode may be located above the anode in an electrolyte pool.

While the electrorefining process and apparatus currently used to recover uranium and plutonium from spent nuclear fuel have certain advantages, it is by necessity a multi-stage operation to obtain both uranium and a mixture of uranium and plutonium for use as blanket and core fuels in nuclear reactors. This multi-stage operation includes the steps of electrorefining the spent blanket fuel in an electrolysis cell to obtain uranium and plutonium, separating the uranium and plutonium obtained from the blanket fuel by halide slagging, adding the recovered plutonium to the electrolyte pool in the electrolysis cell to enrich the core fuel and then electrorefining the spent core fuel to obtain a mixture of uranium and plutonium. In addition, this process uses solid cathodes in electrolysis cells which provide for the recovery of uranium and plutonium sequentially, rather than simultaneously. This process features results in an increased concentration of plutonium in the electrolyte salt which is undesirable. Accordingly, a new electrorefining process and apparatus are derived which eliminate the multistage operation and provide for the sequential recovery of uranium and a mixture of uranium and plutonium to be used as new blanket and core fuel, respectively.

SUMMARY OF THE INVENTION

One of the primary objects of the invention is to provide an improved electrorefining process and apparatus for the sequential recovery of uranium and a mixture of uranium and plutonium from spent nuclear fuels in a single electrolysis cell.

Another object of this invention is to provide an improved electrorefining process and apparatus by which spent nuclear fuel, including blanket and core fuel, may be refined to recover uranium and a mixture of uranium and plutonium in a single electrolysis cell.

A further object of this invention is to provide an electrorefining process for the recovery of uranium and a mixture of uranium and plutonium in sufficient amounts and concentrations to produce new blanket fuel and core fuel for use in nuclear reactors.

It is an additional object of the invention to provide an electrorefining process and apparatus which use an electrolysis cell having two cathodes for the sequential recovery of uranium and a mixture of uranium and plutonium in a single electrolysis cell.

Briefly, the invention is directed to an electrorefining process and apparatus for recovering uranium and a mixture of uranium and plutonium from spent fuels using an electrolytic cell having a lower molten cadmium pool containing spent nuclear fuel, an intermediate molten electrolyte pool containing mixed metal chloride salts floating on said lower molten cadmium pool, an anode basket containing spent nuclear fuel, two cathodes, and electrical power means connected to the molten cadmium pool and an anode and a plurality of cathodes for providing electrical power to the cell. With this cell, additional amounts of uranium and plutonium from the anode basket are dissolved in said molten cadmium pool, and then purified uranium is electrolytically transported to and deposited on a first cathode. Subsequently a mixture of uranium and plutonium is electrolytically transported to and deposited on a second cathode. More particularly, the process of the present invention uses a single electrolysis cell with two cathodes: a first cathode which may be composed of a solid alloy or molten cadmium and a second cathode composed of molten cadmium, wherein purified uranium is electrolytically deposited on the first cathode and a mixture of uranium and plutonium is electrolytically deposited on the second cathode. Some of the advantages of the process of this invention are (1) the electrorefining of spent fuels to recover uranium and a mixture of uranium and plutonium can be carried out in a single electrolysis cell; (2) spent blanket and core fuels can be refined simultaneously; (3) the halide-slagging step is eliminated; and (4) the resulting products, uranium and a mixture of uranium and plutonium, can be used as new blanket and core fuels, respectively, in nuclear reactors.

Further objects and advantages of the process and apparatus of this invention will become apparent from the following detailed description of the invention when taken in conjunction with the accompanying drawings wherein like reference numerals designate like elements throughout the several views.

DETAILED DESCRIPTION

As generally referred to, spent fuel is a mixture of the blanket fuel and core fuel used in nuclear reactors, and is composed of a mixture of U and Pu contaminated with one or more metals such as, for example, Mo, Ru, Rh, Zr, Pd and Pt, as well as other metals and non-metals, for example I and Kr. The spent fuel is removed from the blanket and core subassemblies and is provided as small disk-like sections cut from a fuel rod to expose the spent fuel. When the spent fuel is introduced to the electrolysis cell, some of the outer fuel cladding, which is insoluble in the electrolyte or cadmium pools, is also present.

Figure 1:
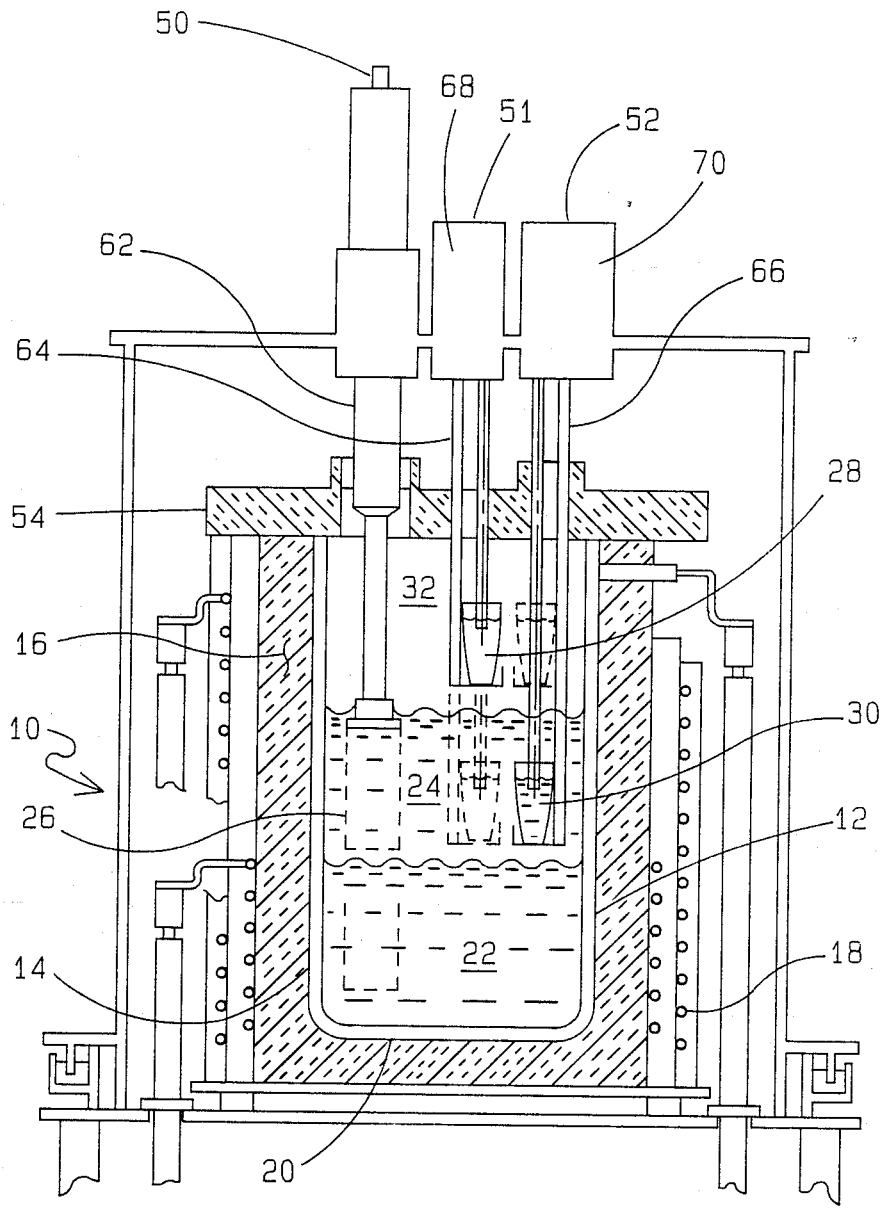
FIG. 1 is a sectional view of one embodiment of an electrolysis cell as one embodiment of the invention.
Figure 2:
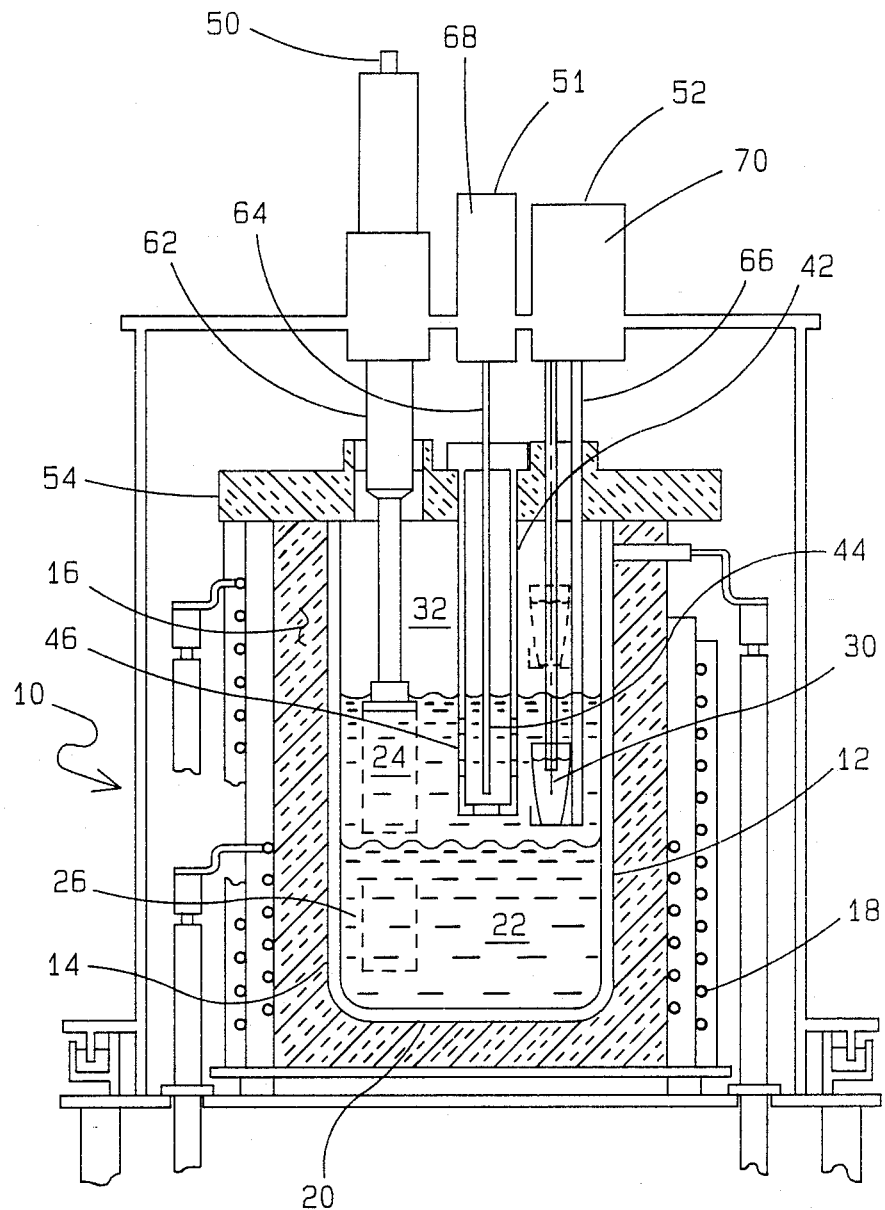
FIG. 2 is a sectional view of an electrolysis cell as another embodiment of the invention.

Two embodiments of the electrolytic cell of this invention are illustrated in FIGS. 1 and 2 (elements common to both FIGS. 1 and 2 are indicated by common reference numerals). In general, a cell 10 includes a metallic pot 12 preferably constructed of an iron alloy. Located around an outer wall 14 of the pot 12 and an insulation layer 16 (which is usually $Al_2O_3$—$S_iO_3$) are heating coils 18 for heating the pot 12 and its contents to temperatures in the order of approximately 450°–525° C. The metallic pot 12 is closed at a bottom portion 20 to hold a lower molten pool 22 of cadmium and dissolved components of the spent fuel. Above the lower molten cadmium pool 22 in an intermediate portion of the metallic pot is an electrolyte pool 24 which is composed of one or more alkali metal halides and halide salts of the metals to be recovered. Preferably, the alkali metal halide salt is eutectic salt of LiCl—KCl (approximately 45 weight percent LiCl, 55 weight percent KCl) with a melting temperature of approximately 352° C., plus the chloride salts of U and Pu.

Figure 3:
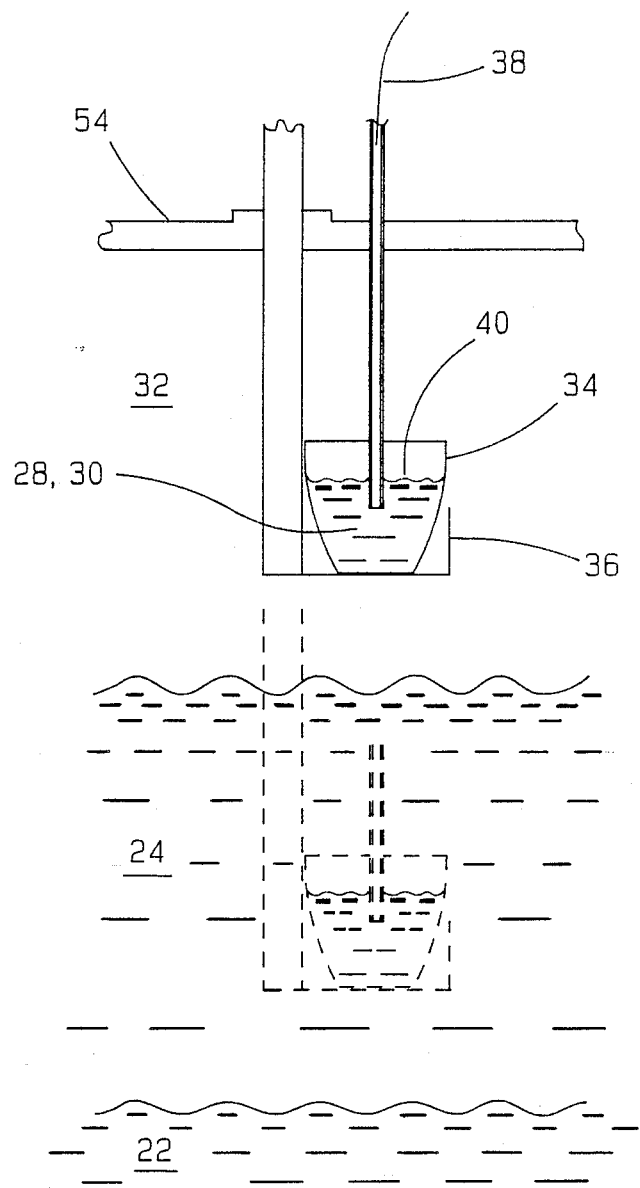
FIG. 3 is a sectional view of a cadmium cathode included in the apparatus of FIGS. 1 and 2 and used in the process of this invention.

The cell 10 also includes one or more anode baskets 26 which are extendable into the electrolyte pool 24 and are further extendable into the lower molten cadmium pool 22. Spent fuel to be refined by the process of this invention is placed in one or more of the anode baskets 26. As illustrated in FIG. 1, one embodiment of the electrolyte cell 10 of this invention also includes at least two cathodes 28 and 30, which can be extended (as shown by phantom lines) into the intermediate electrolyte pool 24 for collecting the recovered metals and retracted (as shown by phantom lines) to an area 32 above the electrolyte pool. Cathodes 28 and 30 are liquid or molten cathodes, preferably molten cadmium cathodes. One embodiment of the molten cadmium cathode 28 or 30 is shown in FIG. 1, and further illustrated in FIG. 3, wherein the molten cadmium is contained in a crucible 34, preferably a beryllium oxide crucible, and is supported by a cradle arrangement 36, for extending and retracting the molten cadmium cathode 28 or 30 into and out of the electrolyte pool 24. The cradle arrangement 36 must be electrically insulated to prevent deposition of product thereon. An electrical lead 38 into the molten cadmium cathode 28 or 30 must also be electrically insulated to a point below the surface of the cadmium cathode 40. The shape of the crucible 34 must allow for easy release of the product after processing, and while the shapes may vary, disk-shaped or conventional cylindrical crucibles with tapered inner walls are preferred.

As illustrated in FIG. 2, another embodiment of the electrolytic cell 10 of this invention includes as a first cathode 42 a conventional solid cathode composed of carbon steel or possibly an alloy of molybdenum-tungsten for recovering U. Solid cathode 42 is constructed with a central metallic rod 44 and an outer non-conductive, perforated cover 46. The cell 10 also includes a second cathode 30 of molten cadmium for recovering the U and Pu mixture. The structure and design of the molten cadmium cathode 30 is the same as that described above, and further illustrated in FIG. 3. Both cathodes 42 and 30 can be extended into the intermediate electrolyte pool 24 for collecting the recovered metal and retracted to an area 32 above the electrolyte pool. Other embodiments of the invention can include more than two cathodes and any number of conventional solid cathodes or molten cadmium cathodes can be used. However, in accordance with this invention, molten cadmium cathodes should be used to recover the mixture of U and Pu.

As also illustrated in FIGS. 1 and 2, the cathodes 28 and 30, or 42 and 30, the anode 26 and the lower molten cadmium pool 22 are connected to power sources 50, 51 and 52. A cover 54 on the metallic pot 12 provides openings 56, 58 and 60 through which the retraction linkages 62, 64 and 66 extend into the metallic pot 12. Motors 68 and 70 are provided for rotation of the cathodes 28 and 30, or 42 and 30.

The electrorefining process of this invention uses the electrolysis cell 10 as described above to recover sequentially U and a mixture of U and Pu from the spent fuel. When the preferred embodiment of the electrolysis cell, as shown in FIG. 1, is used, i.e., two or more liquid cadmium cathodes 28 and 30 are included, the steps of the preferred electrorefining process are as follows: first, the spent fuel portions of the blanket and core subassemblies are chopped or shredded, mixed and loaded into one or more anode baskets. The anode basket 26 is placed in the electrolysis cell 10 and extended into the lower molten cadmium pool 22, which is at a temperature of approximately 500°–525° C. Portions of the spent fuel, in particular U and Pu, are dissolved in the lower molten cadmium pool 22. Alternatively, the spent fuel can be dissolved by anodic dissolution, i.e., the anode basket 26 is extended into the intermediate molten electrolyte pool 22 and becomes an anode, the lower molten cadmium pool is a cathode, and portions of the spent fuel, in particular U and Pu, are electrolytically transported for dissolution to the lower molten cadmium pool 22.

After U and Pu are dissolved in the lower molten cadmium pool 22, cadmium chloride may be added to the electrolyte pool 24 to oxidize all the alkali and alkaline earth metals, most of the lanthanides and sufficient amounts of U and Pu to form a 6 mol percent solution of $UCl_3$ and $PuCl_3$ in the electrolyte. When the lower cadmium pool 22 is saturated with U, but not Pu, a first molten cadmium cathode 28 is then extended into the electrolyte pool 24. Sufficient amounts of U must be dissolved to saturate the lower cadmium pool 22 and to maintain U-saturation throughout electrotransport and deposition of U. The lower molten cadmium pool 22 is then made an anode, and U dissolved in the anode is electrolytically transported to and deposited on the molten cadmium cathode 28. Initially, a minimal amount of Pu, less than 1% by weight, is also transported and deposited in the cathode 28 to bring the Pu activity in the cathode 28 to the same level as that in the anode 22. After that, the U dissolved in the anode 22 is electrotransported and deposited on or in the cathode 28 as a metal. Electrotransport and deposition of U, and not Pu, continues until the anode 22 is no longer saturated with U.

During the electrotransport and deposition of U on the cathode 28, the cell voltage remains substantially constant because the transport of U results in no activity change in either the anode or cathode and the potential difference between the electrodes remains at zero. Electrotransport and deposition of Pu raises the anode potential and decreases the cathode potential. Thus, the endpoint of the electrotransport of U is indicated by an increase in the cell voltage, i.e., the point at which the anode potential, as measured with a reference electrode, increases and the cathode potential decreases. The cadmium cathode 28 containing U can then be retracted from the electrolyte pool, and the cathodes removed from the cell to a retort where the cadmium is vaporized and the U is melted. Alternatively, the cadmium cathode 28 containing U can be retracted from the electrolyte to the area 32 above the electrolyte pool 24 and then removed following the electrotransport and deposition of the U-Pu mixture.

A second molten cadmium cathode 30 is then extended into the electrolyte pool 24, and the remaining U and Pu dissolved in the lower molten cadmium pool anode 22 is electrotransported and deposited on the cathode 30. During this stage of the process, U is deposited as a metal in the cadmium cathode 30 and Pu combines with the cadmium to produce $PuCd_6$. The cell voltage increases at a nearly constant rate throughout the electrotransport of U and Pu, and sharply increases when the heavy metal content of the anode is exhausted. The endpoint of the electrotransport and deposition of the U-Pu mixture is indicated by the sharp increase in the cell voltage.

Since Pu combines with cadmium to produce $PuCd_6$, complete electrotransport and deposition of all Pu present would result in a solid cathode of $PuCd_6$. It is preferred that the cadmium cathode 30 remain fluid, so the electrotransport and deposition of U and Pu should be terminated prior to completion, preferably when the Pu concentration in the cadmium cathode is approximately 11 to 15 weight percent. When electrotransport and deposition of the U-Pu mixture is completed, or terminated, the second cadmium cathode 30 is retracted from the electrolysis cell 10 and placed in a retort to vaporize the cadmium and melt the U-Pu mixture.

As illustrated in FIG. 2, another embodiment of the electrolytic cell 10 of this invention uses a solid cathode 42, rather than a molten cadmium cathode, for recovering the U fraction in the first step of the electrorefining process. Since U and Pu deposit sequentially on a solid cathode, substantially pure U can be electrotransported and deposited on a first solid cathode 42 with virtually no Pu or rare earth elements depositing on the cathode in the metal phase. Also, since U and Pu deposit sequentially, it is unnecessary to maintain the uranium-saturation concentration in the anode 22 which is required to prevent Pu deposition when only molten cadmium cathodes are used. Thus, a solid cathode 42 can be used to recover the U fraction and then a molten cadmium cathode 30 can be used to recover the U-Pu mixture. When a solid cathode 42 is used, however, salt containing chlorides of lanthanides, plutonium and other elements cling to the dendritic U deposit and should be removed. Thus, an additional processing step to remove the salts is typically employed.

Following the electrotransport and deposition of the U-Pu mixture, the electrolytic cell 10 in treated and restored to repeat the electrorefining process of additional spent fuels. First, cadmium chloride is added to the electrolyte pool 24 to remove any remaining traces of active metal, i.e., U, Pu, and lanthanides, from the anode basket 26. A slightly excessive amount of cadmium chloride can be used to insure that Pu will not be lost in the anode basket waste. The anode basket 26 containing the cladding hulls and other insoluble materials is then removed as the metal waste. Lithium and potassium are then introduced beneath the surface of the molten cadmium pool 22 to reduce first U, then Pu, and then a small fraction of the rare earth metals from the electrolyte salt pool 24 to the molten cadmium pool 22. The metals remain in the molten cadmium pool 22 and are combined with the next load of spent fuel for the electrorefining process. Some U and Pu will remain in the electrolyte pool 24 because of equilibrium conditions, but the separation of U and Pu from the rare earth metals is sufficient for purposes of this process.

A large fraction of the electrolyte salt is then either transferred through liquid transfer lines to a separate vessel or isolated within the electrorefiner in a large pipe and treated with lithium and potassium in cadmium to reduce the rare earth elements and actinides and transfer them to the metal phase. The concentration of the actinide elements, i.e., Pu, americurium and curium, can be reduced to a sufficiently low level to classify the salt as nontransuranic. Thus, the treated salt is substantially free of both actinides and lanthanides. A sufficient amount of the treated salt is returned to the electrolytic cell 10 to maintain original concentrations, and then the excess treated salt and reducing agent are discarded with the metal waste. Also, since the concentration of sodium chloride increases in the electrolyte cell during the process, any excess sodium chloride is discarded to maintain a sodium chloride concentration in the electrolyte salt below about twenty mol percent. After the electrolyte salt and molten cadmium pool have been prepared or treated in this manner, the electrorefining process can then be repeated with a new batch of spent fuels.

As presently understood by the inventors, the electrochemical basis for the process of the present invention can best be explained in terms of both the solubilities of U and Pu in cadmium and the ratio of U to Pu in spent fuel. The solubilities of U and Pu in cadmium at 500° C. are 0.0114 and 0.0180 mol fraction, respectively. On the average, the amounts of U and Pu in the standard batch of spent core fuel are 22.4 kg and 4.9 kg, respectively. The amounts of U and Pu in the standard batch of spent blanket fuel are 40.8 kg and 1.9 kg, respectively. If the core and blanket fuels are mixed or combined, then the U/Pu ratio by mass is 9.24/1. Using the similar solubilities of U and Pu and the large U/Pu mass ratio, sufficient amounts of spent fuel can be dissolved in a molten cadmium pool anode to provide a situation where the anode is saturated with U, but not with Pu, over sufficient ranges of anode size to deposit substantially pure U on a first cathode.

When molten cadmium cathodes as shown in FIG. 1 are used, the size of the first cathode 28 is preferably considerably smaller than the molten cadmium anode 22, so that during the electrorefining process, the first cathode 28 is saturated with U almost immediately. The molten cadmium pool anode 22 should be a size sufficiently large to remain saturated with U until one blanket batch, or 40 kg, of uranium has been removed. When the standard amounts of spent core and blanket fuels are used, the first cathode 28 preferably contains approximately 18.5 kg of cadmium and the molten cadmium pool 22 anode has a mass of about 850 kg of cadmium. While larger anodes may be used, such sizes result in a slightly lower Pu content in the first cathode at the expense of considerably less U deposition in the first cathode.

When the molten cadmium pool anode 22 is saturated with U, but not with Pu, substantially pure U is electrotransported and deposited on the first cadmium cathode 28. In the reference case, approximately 60% of the U and less than 1% of Pu is transferred in this step. The remaining U and Pu is electrotransported and deposited on the second cadmium cathode 30, with approximately 99% of the U and Pu being recovered by the end of the process. The U-Pu mixture should contain approximately 25-50 wt % Pu to provide a sufficient U-Pu mixture for use as new driver fuel.

The size of the second cadmium cathode 30 is determined by the amount of Pu being processed, because the Pu reacts with the cadmium to form $PuCd_6$ while the U collects as a metal and only slightly affects the volume. The concentration of Pu in $PuCd_6$ is 26 weight percent and is a weight fraction which corresponds to the reaction of all cadmium with the Pu resulting in a solid cathode of $PuCd_6$. To maintain fluidity in the cathode, Pu deposition should be terminated at a lower weight fraction, preferably at a Pu concentration of 11 to 15 weight percent. Based on such limitations, the cathode volume would be approximately 4.1 liters for deposition of 10 kg of the U-Pu mixture at a U/Pu mass ratio of approximately 5/1.

When a solid cathode and molten cadmium cathode as shown in FIG. 2 is used, it is unnecessary to maintain the uranium-saturation in the molten cadmium pool for reasons explained above, i.e., U and Pu deposit sequentially on a solid cathode, so that substantially pure U can be collected. Thus, the size of the solid anode and the size of the molten cadmium pool can be determined by the amount of U processed. The size of the second cathode, the molten cadmium cathode, is determined as explained above by the amount of Pu processed.

Larger amounts of spent blanket and driver fuels than the standard batch could be electrorefined to recover U and the U-Pu mixture in the process of this invention. The process scales directly, i.e., the ratio of materials used remains constant. The process can thus be scaled up to the point where the amount of Pu present approaches the critical mass of a sphere of pure plutonium.

While preferred embodiments of the present invention have been illustrated and described, it will be understood that changes and modifications can made therein without departing from the invention in broader aspects. Various features of the invention are defined in the following claims.

The embodiments of this invention in which an exclusive property or privilege is claimed are defined as follows:

1. A process for refining spent nuclear fuel containing uranium and plutonium, comprising the steps of:
providing an electrolytic cell having a lower molten cadmium pool containing spent nuclear fuel, an intermediate molten electrolyte pool containing mixed metal chloride salts floating on said lower molten cadmium pool, an anode basket containing spent nuclear fuel, a first and second cathode, said first cathode composed of a solid alloy or molten cadmium and said second cathode composed of molten cadmium, and electrical power means connected to said molten cadmium pool, said anode basket and said cathodes for providing electrical power to the cell,
dissolving additional amounts of uranium and plutonium from said anode basket in said molten cadmium pool,
electrolytically depositing substantially pure uranium on said first cathode, and
subsequently electrolytically depositing a mixture of uranium and plutonium on said second molten cadmium cathode.

2. The process of claim 1 wherein said first cathode is composed of a solid alloy.

3. The process of claim 1 wherein said first cathode is composed of molten cadmium.

4. The process of claim 3 wherein said molten cadmium pool is saturated with uranium and remains saturated with uranium until the step of depositing of uranium on said first molten cadmium cathode is complete.

5. The process of claim 4 wherein the cell voltage is substantially constant during the step of electrolytically depositing uranium on said first cathode.

6. The process of claim 4 wherein the cell voltage increases at a substantially constant rate during the step of electrolytically depositing the mixture of uranium and plutonium on said second cathode.

7. A process for refining spent nuclear fuel containing uranium and plutonium, comprising the steps of:
providing an electrolytic cell having a lower molten cadmium pool containing spent nuclear fuel, an intermediate molten electrolyte pool containing mixed metal chloride salts floating on said lower molten cadmium pool, an anode basket containing spent nuclear fuel, a first and second cathode, said first cathode composed of a solid alloy and said second cathode composed of molten cadmium, and electrical power means connected to said molten cadmium pool, said anode basket and said cathodes for providing electrical power to the cell,
dissolving additional amounts of uranium and plutonium from said anode basket in said molten cadmium pool,
extending said first cathode into said intermediate molten electrolyte pool,
electrolytically depositing uranium on said first cathode,
retracting said first cathode from said intermediate molten electrolyte pool,
subsequently extending said second molten cadmium cathode into said intermediate electrolyte pool,
electrolytically depositing a mixture of uranium and plutonium on said second molten cadmium cathode, and
retracting said second molten cadmium cathode from said intermediate molten electrolyte.

8. The process of claim 7 wherein said first cathode is composed of a solid alloy.

9. The process of claim 7 wherein said first cathode is composed of molten cadmium.

10. The process of claim 9 wherein said molten cadmium pool is saturated with uranium and remains saturated with uranium until the step of electrolytically depositing uranium on said first cathode is complete.

11. The process of claim 10 wherein the cell voltage is substantially constant during the step of electrolytically depositing uranium on said first cathode.

12. The process of claim 10 wherein the cell voltage increases at a substantially constant rate during the step of electrolytically depositing the mixture of uranium and plutonium on said second cathode.

13. A process for refining spent nuclear fuel containing uranium and plutonium, comprising the steps of:
   providing an electrolytic cell having a lower molten cadmium pool containing spent nuclear fuel, an intermediate molten electrolyte pool containing mixed metal chloride salts floating on said lower molten cadmium pool, an anode basket containing spent nuclear fuel, two molten cadmium cathodes, and electrical power means connected to said molten cadmium pool, said anode basket and said cathodes for providing electrical power to the cell,
   dissolving additional amounts of uranium and plutonium in said lower molten cadmium pool,
   saturating said lower molten cadmium pool with uranium, but not with plutonium,
   extending a first molten cadmium cathode into said intermediate molten electrolyte pool,
   electrolytically transporting and depositing uranium on said first cathode until said lower molten cadmium pool is no longer saturated with uranium,
   extending a second molten cadmium cathode into said intermediate molten electrolyte pool,
   electrolytically transporting and depositing a mixture of uranium and plutonium on said second cathode,
   retracting said first and second cathodes from said intermediate molten electrolyte pool, and
   vaporizing said cadmium to provide purified uranium and uranium-plutonium products.

14. The process of claim 13 wherein said molten cadmium pool is saturated with uranium and remains saturated with uranium until the step of electrolytically depositing uranium on said first cathode is complete.

15. The process of claim 14 wherein the cell voltage is substantially constant during the step of electrolytically depositing uranium on said first cathode.

16. The process of claim 14 wherein the cell voltage increases at a substantially constant rate during the electrolytic deposition of the mixture of uranium and plutonium on said second cathode.

17. An electrolytic cell for recovering U and a mixture of U and Pu from spent nuclear fuel comprising:
   a metallic pot including forming a lower zone for retaining a lower molten cadmium pool containing spent nuclear fuel and an intermediate zone for retaining a molten electrolyte salt floating on said molten cadmium pool,
   electrode means including at least one anode basket containing spent nuclear fuel, a first solid cathode for collecting U and a second molten cadmium cathode for subsequently collecting a mixture of U and Pu,
   means for extending said anode basket into the intermediate and lower zones and said cathodes into the intermediate zone, and means for retracting said anode basket and said cathodes from said intermediate and lower zones to an area above said zones, and
   electrical power means connected to said anode basket, said cathodes and said molten cadmium pool for providing electrical power to the cell.

18. An electrolytic cell for recovering U and a mixture of U and Pu from spent nuclear fuel comprising:
   a metallic pot including forming a lower zone for retaining a lower molten cadmium pool containing spent nuclear fuel and an intermediate zone for retaining a molten electrolyte salt floating on said molten cadmium pool,
   electrode means including at least one anode basket containing spent nuclear fuel, a first molten cadmium cathode for collecting U and a second molten cadmium cathode for subsequently collecting a mixture of U and Pu,
   means for extending said anode basket into the intermediate and lower zones and said cathodes into the intermediate zone, and means for retracting said anode basket and cathodes from said intermediate and lower zones to an area above said zones, and
   electrical power means connected to said anode basket, said cathodes and said molten cadmium pool for providing electrical power to the cell.

* * * * *